United States Patent [19]

Fotland

[11] Patent Number: 4,558,334

[45] Date of Patent: Dec. 10, 1985

[54] ELECTROSTATIC IMAGING DEVICE

[76] Inventor: Richard A. Fotland, 220 Chamberlain St., Holliston, Mass. 01746

[21] Appl. No.: 501,453

[22] Filed: Jun. 6, 1983

[51] Int. Cl.[4] .............................................. G01D 15/06

[52] U.S. Cl. .................................... 346/159; 250/325; 250/326; 250/426; 315/111.81; 315/111.91; 361/229; 361/230

[58] Field of Search ................ 346/159; 250/325, 326, 250/426; 315/111.81, 111.91; 361/229, 230

[56] References Cited

U.S. PATENT DOCUMENTS

| | | | |
|---|---|---|---|
| 4,155,093 | 5/1979 | Fotland et al. | 346/159 |
| 4,160,257 | 7/1979 | Carrish | 346/159 |
| 4,409,604 | 10/1979 | Fotland | 346/159 |

*Primary Examiner*—Thomas H. Tarcza

[57] ABSTRACT

An ion generator for the formation of electrostatic images, including two electrodes at opposite faces of a solid dielectric member, using a threshold multiplexing principle for the drive circuit. The apparatus provides a drive signal to each electrode to generate ions in an air region adjacent one of the electrodes, which ions are extracted for electrostatic imaging. Two drive signals each consisting of a sinusoidal alternating potential, out of phase by 180°, intermittently induce the production and extraction of ions. Other time-varying potentials of like electrical characteristics may be used, providing a number of operating advantages. The ion generator produces ions only during print periods, and requires reduced power to achieve given ion outputs. The control electrode may be partially encapsulated to limit the discharge region. Drive circuitry such as low source impedance gated oscillators, or other low impedance drivers, reduce capacitive "cross-talk" in a multielectrode device.

21 Claims, 13 Drawing Figures

ELECTROSTATIC IMAGING DEVICE

BACKGROUND OF THE INVENTION

The present invention relates to ion generators, and more particularly to ion generators employed for electrostatic imaging.

A wide variety of techniques are commonly used to generate ions for electrostatic imaging. Conventional approaches include air gap breakdown, corona discharges, spark discharges, and others. The use of air gap breakdown requires close control of gap spacing, and typically results in non-uniform latent charge images. Corona discharges, which are widely favored in electrostatic copiers, provide limited currents and entail considerable maintenance efforts. Electrical spark discharge methods are unsuitable for applications requiring uniform ion currents. Other methods suffer comparable difficulties.

Apparatus and methods for generating ions representing a considerable advance over the above techniques are disclosed in commonly assigned U.S. Pat. No. 4,155,093, issued May 15, 1979. The ion generator of this invention, shown in one embodiment at 10 in FIG. 1, includes two conducting electrodes 12 and 13 separated by a solid insulator 11. When a high frequency electric field is applied between these electrodes by source 14, a pool of negative and positive ions is generated in the area of proximity of the edge of electrode 13 and the surface of dielectric 11. Thus in FIG. 1, an air gap breakdown occurs relative to a region 11-*r* of dielectric 11, creating an ion pool in hole 13-*h*, which is formed in electrode 13. This air breakdown is of the "glow discharge" type, characterized by a faint blue glow in the discharge region, at an inception voltage of around 350–400 volts.

These ions may be used, for example, to create an electrostatic latent image on a dielectric member 100 with a conducting backing layer 105. When a switch 18 is switched to position X and is grounded as shown, the electrode 13 is also at ground potential and little or no electric field is present in the region between the ion generator 10 and the dielectric member 100. However, when switch 18 is switched to position Y, the potential of the source 17 is applied to the electrode 13. This provides an electric field between the ion reservoir 11-*r* and the backing electrode 16. Ions of a given polarity (in the generator of FIG. 1, negative ions) are extracted from the air gap breakdown region and charge the surface of the dielectric member 100. The charge formed on dielectric 100 is seen to increase generally in proportion to the number of excitation cycles of drive potential 14. Because it is necessary in order to form an electrostatic image on dielectric 100 to have a coincident drive voltage 14 and extraction voltage 17, this device is amenable to multiplexing.

One advantageous use of the ion generator disclosed in the above patent is for the formation of electrostatic images such as for high speed electrographic printing. When employed for this purpose, the apparatus of U.S. Pat. No. 4,155,093 encounters certain difficulties discussed in the Background of the Invention of the commonly assigned improvement patent, U.S. Pat. No. 4,160,257. With reference to the prior art sectional view of FIG. 2, the ion generator 20 includes in addition to the above disclosed elements an apertured screen electrode 21, which is separated from the control electrode 13 and solid dielectric member 11 by a dielectric spacer 23. This additional electrode was found necessary to cure the problem of accidental erasure of a latent electrostatic image previously formed on the dielectric surface 100. This would occur in the apparatus of FIG. 1 if a high voltage alternating potential were imposed between the control and driver electrodes, without any extraction potential applied to the control electrode 13. In this instance, any previously formed charge image on the dielectric surface 100 would create an electrostatic extraction field tending to attract of ions of opposite polarity from the control aperture 13-*h*, thereby partially or completely erasing the electrostatic image. As discussed in detail in U.S. Pat. No. 4,160,257, the inclusion of screen electrode 21 has been found to prevent such accidental image erasure by imposing a screen potential 28 between the screen electrode 21 and counterelectrode 105 of the same polarity as control potential 17.

The significant advantages provided by the three electrode design of U.S. Pat. No. 4,160,257 have been found to be somewhat offset by certain disadvantages of the screen electrode. Perhaps most significantly, the screen electrode tends to attract a significant percentage of the ions emerging from control aperture 13-*h*, thereby reducing the ion output current of ion generator 20. In some cases, the screen electrode has been found to attract as much as 95 percent of these ions. The reduction in ion output efficiency attributable to this screen transmission loss necessitates the use of significantly higher driving potentials to achieve a desired output current level. This increase in driving potentials in turn incurs other disadvantages, such as an increase in the unavoidable chemical byproducts of the ion generation process, and an aggravation of the voltage stress between adjacent drive electrodes 12 in a multielectrode ion generator. Additionally, the screen electrode 21 complicates the design of ion generator 20, which for example increases the difficulty of cleaning this device.

Accordingly, it is a principal object of the invention to provide an improved ion generator for the formation of electrostatic images. A related object of the invention is to provide an ion generator which achieves the advantages of the device disclosed in U.S. Pat. No. 4,160,256, while avoiding many of the disadvantages of this design.

Another object of the invention is to reduce the power requirements of an ion generator of this type, while maintaining acceptable ion output current levels. A related object is the avoidance of screen transmission losses characteristic of the '256 three electrode device.

A further object of the invention is to avoid undesirable phenomena associated with high driving potentials. A specific object is the reduction of environmental byproducts of the ion generation process. Another object is to reduce voltage stresses by the adjacent driver electrodes, thereby reducing the risk of arcing.

Yet another object of the invention is simplicity of construction of an ion generator. Related objects include facilitating the fabrication of such devices, and reducing maintainance requirements.

SUMMARY OF THE INVENTION

The invention provides improved ion generators for electrostatic imaging, which fulfill the above objects in a simple, reliable, and efficient design. The ion generator includes one or more driver electrode and control electrode on opposite faces of a solid dielectric member, with time-varying potentials supplied to each of the electrodes to intermittently induce formation of ions adjacent the control electrode. The driving signals are coordinated in their phase relationship to provide a potential difference which intermittently exceeds an inception voltage for the ion generator, i.e. a threshold voltage between the driver and control electrodes, below which no ions are produced. The ion generator enjoys reduced power requirements, voltage stresses, and chemical byproducts; and facilitates maintainance efforts.

One aspect of the invention relates to the nature of the actuating voltage source. In the preferred embodiment, the drive signal is a sinusoidal alternating potential, with a phase shift between the driver and control waveforms. No ion-producing discharges occur unless the peak potential difference between the electrodes exceeds the inception voltage. A 180° phase shift between the control and driver signals achieves a maximum drive voltage to induce a glow discharge. A phase shifter may be utilized to control the peak voltage. This arrangement allows ion generation using half the usual operating voltage (peak-to-peak). Other waveforms, such as square wave signals, may be utilized provided that they achieve the requisite threshold effect.

Another aspect of the invention relates to the extraction of ions for electrostatic imaging. During normal operation when not printing from a given ion generation site no ions will be produced, thereby reducing undesirable chemical byproducts. The presence of an actuating potential to the control electrode, in combination with a control electrode bias, ensures that ions will be extracted for imaging. This avoids the need for a third, modulating electrode to control the extraction of ions, and eliminates transmission losses associated with such an electrode.

Still another aspect of the invention concerns the choice of drive potential levels and control bias voltage. In the preferred embodiment, the drive circuit provides time-varying signals for the control and drive electrodes, each biased with respect to the potential of a counterelectrode which provides an ion extraction field. The various potentials are chosen to achieve the requisite threshold value, while avoiding unduly high potentials intermediate the control electrode and counterelectrode, which would lead to arcing. A related aspect is ensuring high quality in the resulting electrostatic images; i.e. avoiding spreading or "blooming". It is desirable in this regard to reduce the spacing between the imaging device and the dielectric image receptor, as well as the control electrode bias.

A further aspect of the invention is the simplicity of physical construction of the ion generators. The use of a two-electrode structure facilitates cleaning of such devices during use.

Still another aspect relates to image definition in electrostatic imaging. In one embodiment of the invention, the control electrode comprises a partially encapsulated line electrode which provides discharge regions at drive electrode crossover sites. In an alternative embodiment, the control electrode is apertured to define the image; an encapsulating dielectric may be included to prevent arcing between electrodes.

In the preferred embodiment of the invention, the ion generator consists of a multiplexable matrix of drive and control lines. This arrangement reduces the number of drivers required for a given number of image elements.

Yet another aspect of the invention is a remedy for the problem of intercapacitance among control electrodes. "Cross-talk" among electrode drivers interferes with the actuation of a plurality of adjacent electrodes. The drive circuits are preferably designed to provide a low source impedance in both the actuated and unactuated state, or alternatively are clamped to a low impedance condition in the absence of excitation. This ensures reliable ion generation in a multiplexed electrostatic print device.

BRIEF DESCRIPTION OF THE DRAWINGS

The above and additional aspects of the invention are illustrated in the following detailed description, taken in conjunction with the drawings in which.

DETAILED DESCRIPTION

Figure 1:
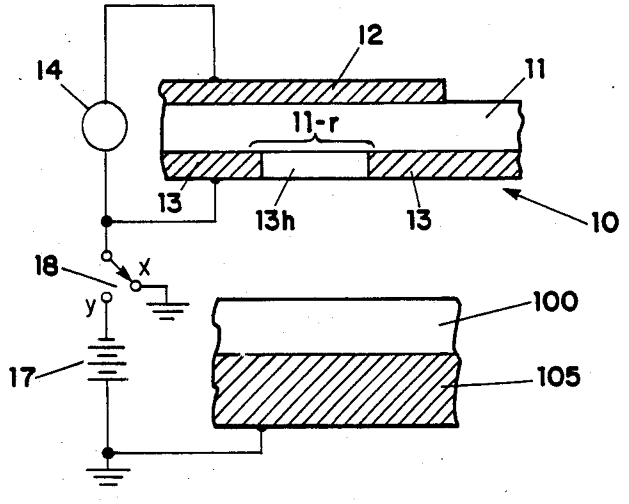
FIG. 1 (PRIOR ART)
FIG. 1 is a partial sectional schematic view of a prior art ion generator in accordance with U.S. Pat. No. 4,155,093.
Figure 2:
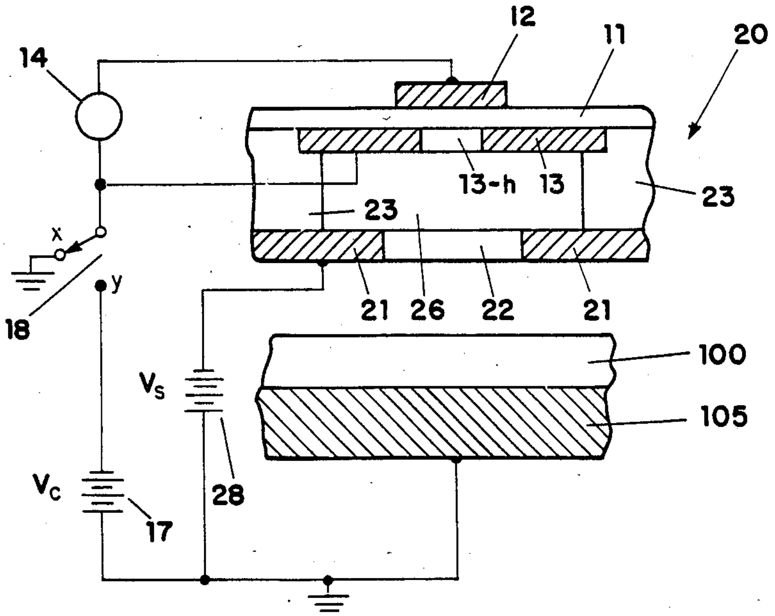
FIG. 2 (PRIOR ART)
FIG. 2 is a partial sectional schematic view of a prior art ion generator as illustrated in U.S. Pat. No. 4,160,257.
Figure 3:
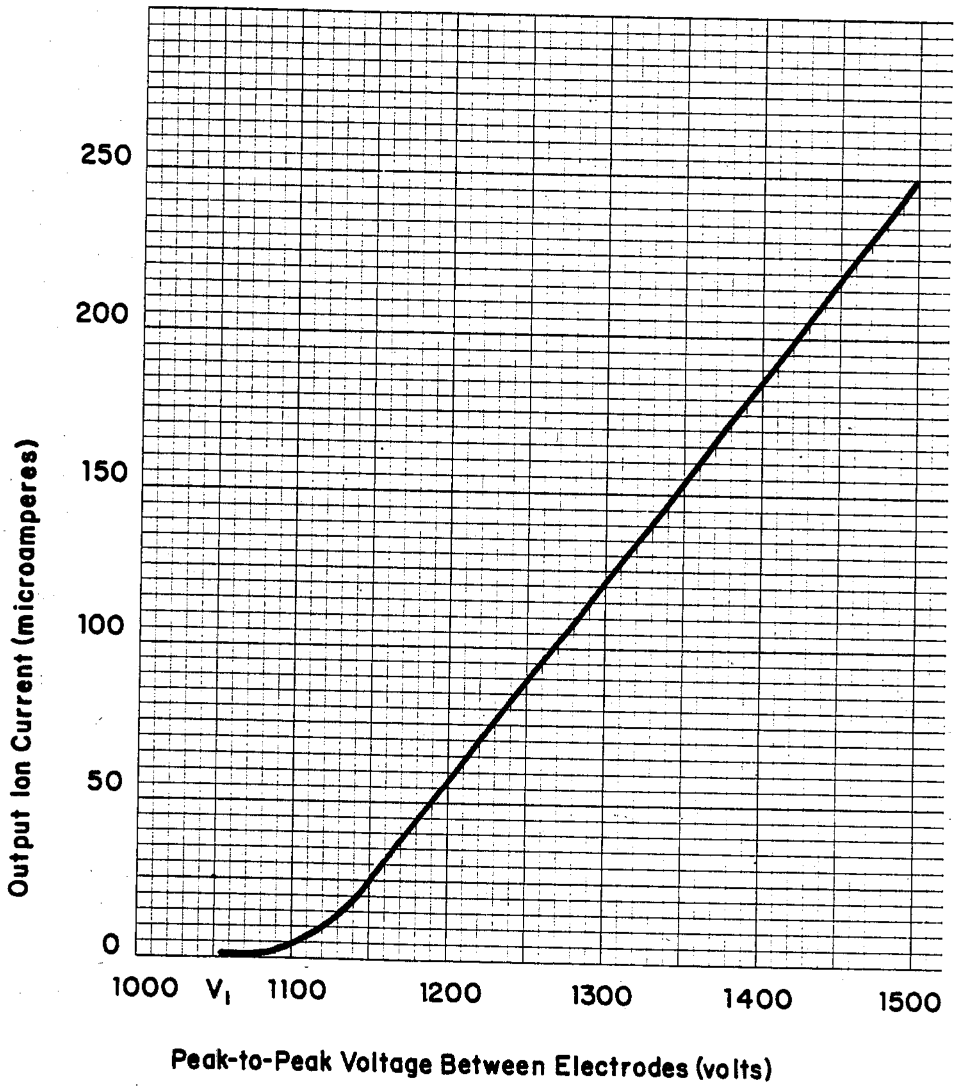
FIG. 3 is a plot of average ion current produced by a glow discharge ion generator as a function of the potential difference between drive and control electrodes.

Reference should now be had to FIGS. 3–11 for a detailed description of electrostatic imaging apparatus in accordance with the invention. The imaging devices disclosed herein utilize the glow discharge ion generation technique embodied in the prior art ion generators illustrated in FIGS. 1 and 2 discussed above. These devices share as a class i-V characteristics of the type plotted in FIG. 3. With reference to the ion generator 20 of FIG. 2, these imaging devices are characterized by an inception voltage $V_I$, i.e. an electromotive force between the drive and control electrodes (12 and 13 respectively) below which no electrical discharge occurs. When the voltage between the electrodes exceeds this threshold value, an atmospheric discharge occurs such as that illustrated at 13*h* in FIG. 1. Above this value, for a given extraction voltage (17 in FIG. 2), the ion current from the discharge region to the imaging surface 100 is observed to increase linearly with the excitation voltage between electrodes 12 and 13. As discussed above, this threshold effect imposes high voltage requirements on prior art apparatus such as that illustrated in FIG. 2, incurring a variety of difficulties. The imaging devices of the invention overcome these disadvantages through the novel drive arrangements discussed below.

Figure 4:
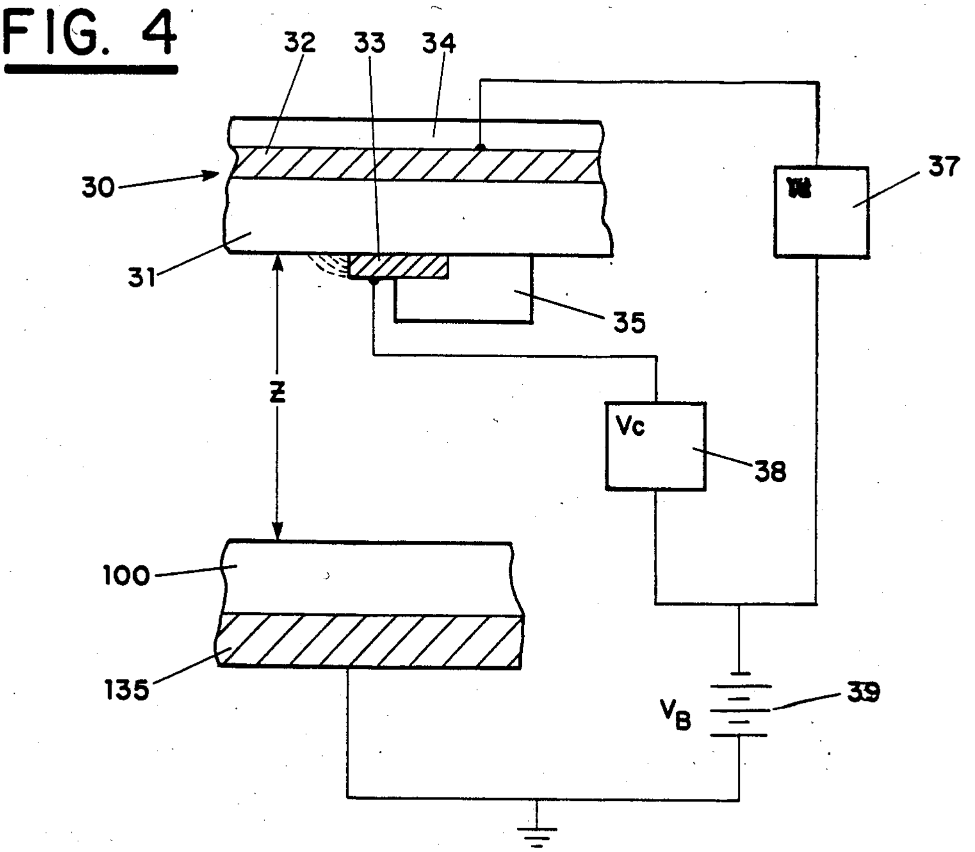
FIG. 4 is a partial sectional schematic view of an electrostatic imaging device in accordance with a preferred embodiment of the invention.

FIG. 4 gives a partial sectional view of an imaging device 30 incorporating an electronic drive scheme according to the invention. FIG. 4 shows a single ion generation site in such a device 30, corresponding to a crossover location between a drive line 32 and control line 33 (compare the perspective view of FIG. 5). Drive electrode 32 receives a signal $V_d$ from waveform generator 37, while control electrode 33 receives a signal $V_c$ from waveform generator 38. Each of these voltage sources is biased by a d.c. potential 39 with respect to ground (i.e. with respect to the reference potential of the counterelectrode 135). Drive electrode 32 is encapsulated with a dielectric 34 to prevent arcing among a plurality of such electrodes, and control line 33 is partially covered with an insulator 35 to limit the ion generation region to one side of electrode 33, as shown at 33-*e*.

The drive signals $V_d$ and $V_c$ have a phase relationship such that the net voltage between electrodes 32 exceeds the inception voltage for this device only during desired print periods, i.e. only during intervals in which ions are to be extracted to form an image on dielectric surface 100. This avoids undue voltage stresses at electrodes 32; "wasted" ion production at ion generation sites from which the ions are thereby extracted to form an electrostatic image; and undesirable side effects of such surplus ion generation including the production of chemical byproducts which tend to erode these structures, and plasma etching resulting from the high voltage ion fields.

Figure 8A:
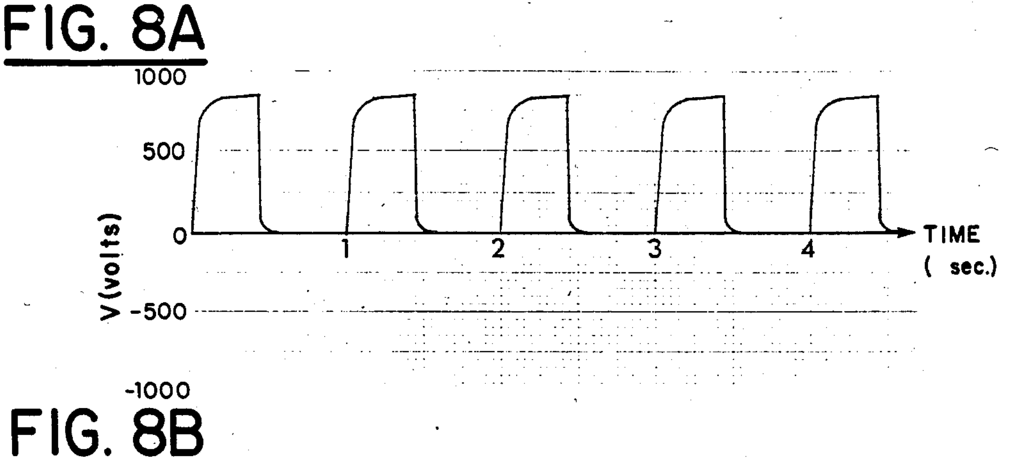
FIG. 8A is a time plot of an illustrative drive signal to the driver electrode, according to the invention.
Figure 8B:
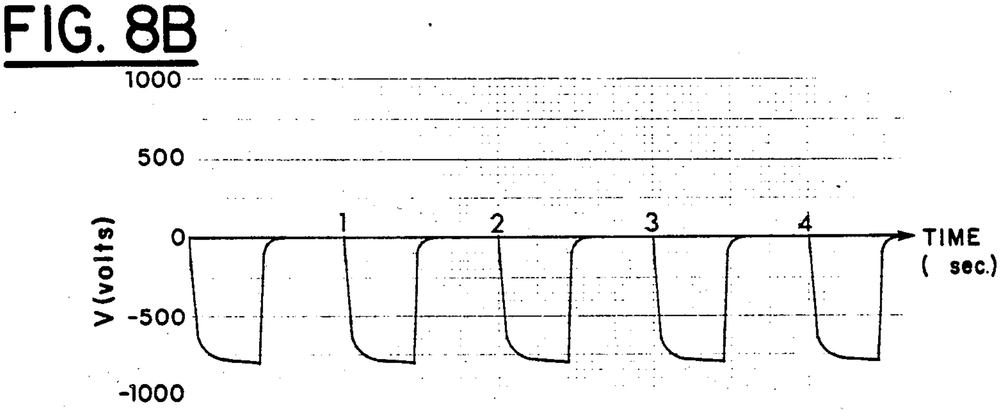
FIG. 8B is a time plot of a drive signal to the control electrode, in timed coordination with the signal of FIG. 8A.

FIGS. 8A,B and 9A,B illustrate suitable time-varying waveforms $V_d$ and $V_c$ to be applied to the driver and control electrodes (for example, in the apparatus in FIG. 4). FIGS. 8A and 8B show square wave signals, wherein the signal of FIG. 8A comprises a train of positive 800 volt pulses, while the signal of FIG. 8B comprises a series of negative pulses, 800 volts in amplitude. Each of the signals has a 0.5 microsecond pulse width and a 1:1 duty cycle. The waveforms are coordinated in time so that periodically there is a net potential difference between the electrodes 32, 33 (FIG. 4) of 1600 volts. Given an inception voltage of 1100 volts peak-to-peak, under these conditions electrical discharges 33*e* will occur only when potentials $V_d$ and $V_c$ are simultaneously present. This requirement for voltage coincidence provides the means for multiplexing a matrix array of electrodes.

Figure 9A:
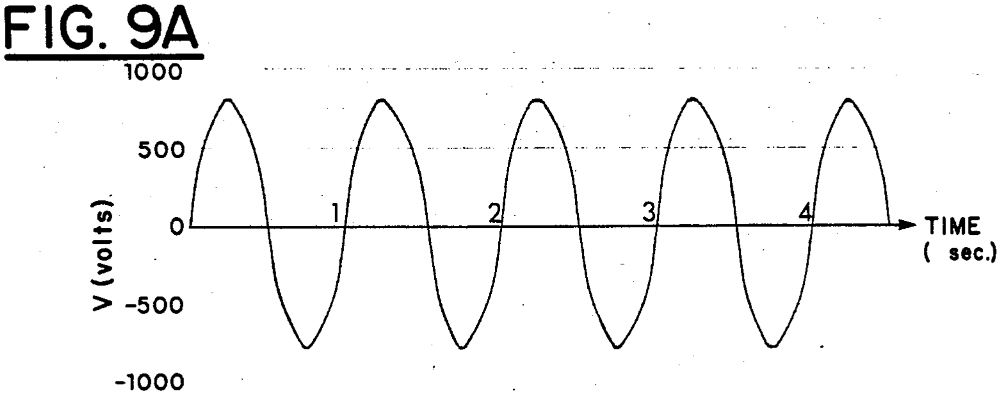
FIG. 9A is a time plot of an alternative drive signal to the driver electrode, according to the invention.
Figure 9B:
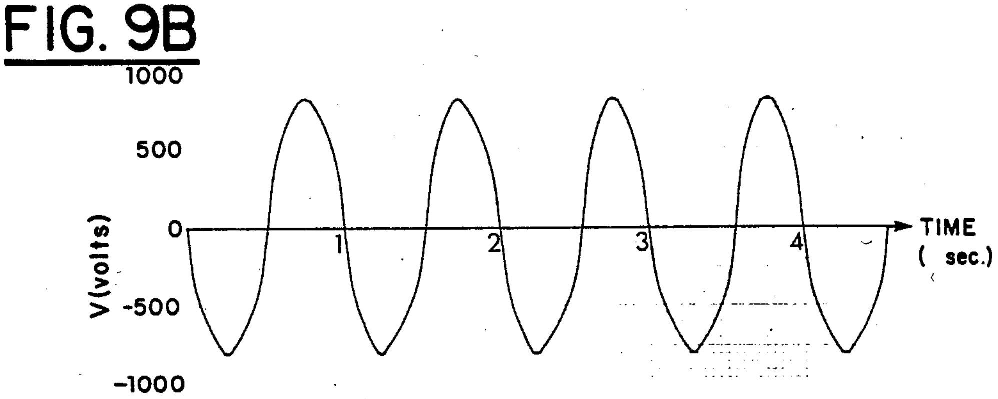
FIG. 9B is a time plot of a drive signal to the control electrode, in timed coordination with the signal of FIG. 9A.

FIGS. 9A and 9B plot alternative waveforms $V_d$ and $V_c$, each of these being a sinusoidal signal of 1600 volts peak-to-peak, frequency 1 MHz. These signals are 180° off phase, so that the peak positive value of $V_d$ coincides with the peak negative value of $V_c$. Assuming that these signals are applied to apparatus with the i-V characteristic of FIG. 3, an electrical discharge will occur only during a portion of each positive segment of $V_d$ and corresponding negative segment of $V_c$, during which the potential difference between the electrodes exceeds the inception voltage. The above waveforms are illustrative only, and may be replaced by other signals having the requisite electrical characteristics (i.e. providing a potential difference which exceeds the characteristic inception voltage during desired print periods).

Figure 5:
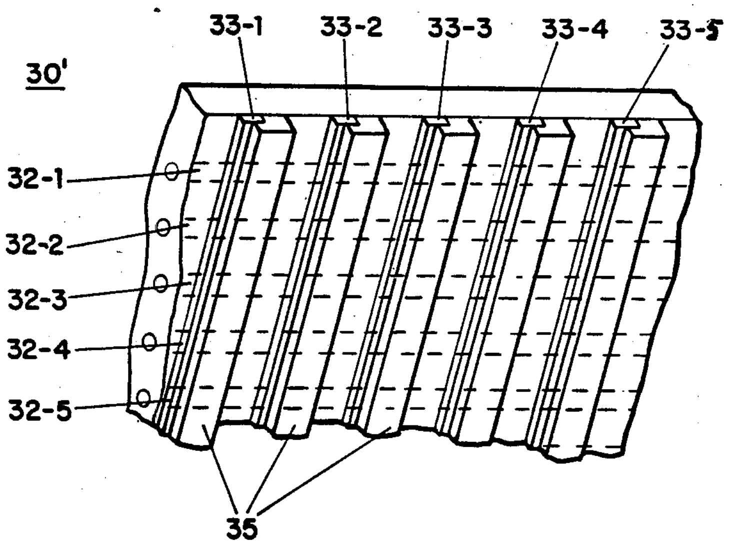
FIG. 5 is a partial perspective view of a matrix ion generator of the type shown in FIG. 4.

FIG. 5 is a partial perspective view of a matrix imaging device 30' of the structural type shown in FIG. 4. Device 30' includes on one face of dielectric sheet 31 an array of parallel drive lines 32-1, 32-2, etc. (shown in phantom), and on the opposite face a crossing array of control lines 33-1, 33-2, etc. Ions are formed at individual crossover sites 34 adjacent the junction of a given control line 33 with the dielectric 31 only when a sufficient potential difference exists between that electrode and the corresponding drive line 32. It is desirable to utilize an N×N array of driver and control electrodes 32, 33 in a multiplexed imaging device 30', thereby reducing the total number of drive circuits 37, 38 for a given number of print sites 34.

With further reference to FIG. 4, ions formed at 33*e* are extracted to form an image on dielectric surface 100 by virtue of the electrostatic field resulting from the instantaneous extraction potential $V_c+V_B$. Using the drive signals of FIGS. 8A, 8B or 9A, 9B, $V_B$ is reduced in amplitude by $V_c$ to derive this extraction voltage. During their travel through the gap z, these ions will tend to form a compact cloud of symmetric cross-section, resulting in a circular image on dielectric 100.

The apparatus of FIG. 4 is designed to avoid spontaneous arcing between the electrode 33 and the dielectric 100, which might occur if the instantaneous voltage between electrodes 33 and 105 exceeds the Paschen limits for the gap width z. Assuming for the purposes of illustration that the sinusoidal signals $V_d$ and $V_c$ of FIGS. 9A and 9B are applied to electrodes 32 and 33, the maximum potential difference will occur at points $V_{max}$ of each cycle during which there will be a total potential difference $V_B+800$ volts. The maximum electrical stress will therefore occur during the interim periods in which ions are not generated at 33*e*. To avoid an unduly high value for $V_{max}+V_B$ which would cause arcing, it is advantageous to utilize a relatively large bias voltage so that the variation over time of $V_c$ has a limited effect on the total potential difference. Another consideration, to ensure excellent print quality, is reducing the "blooming" or spreading of the electrostatic dot images formed on dielectric 100. This represents a limiting factor on gap width z; the value of z may be reduced to limit blooming by reducing $V_c$; $V_B$ may be increased by one half the value of this reduction.

Figure 6:
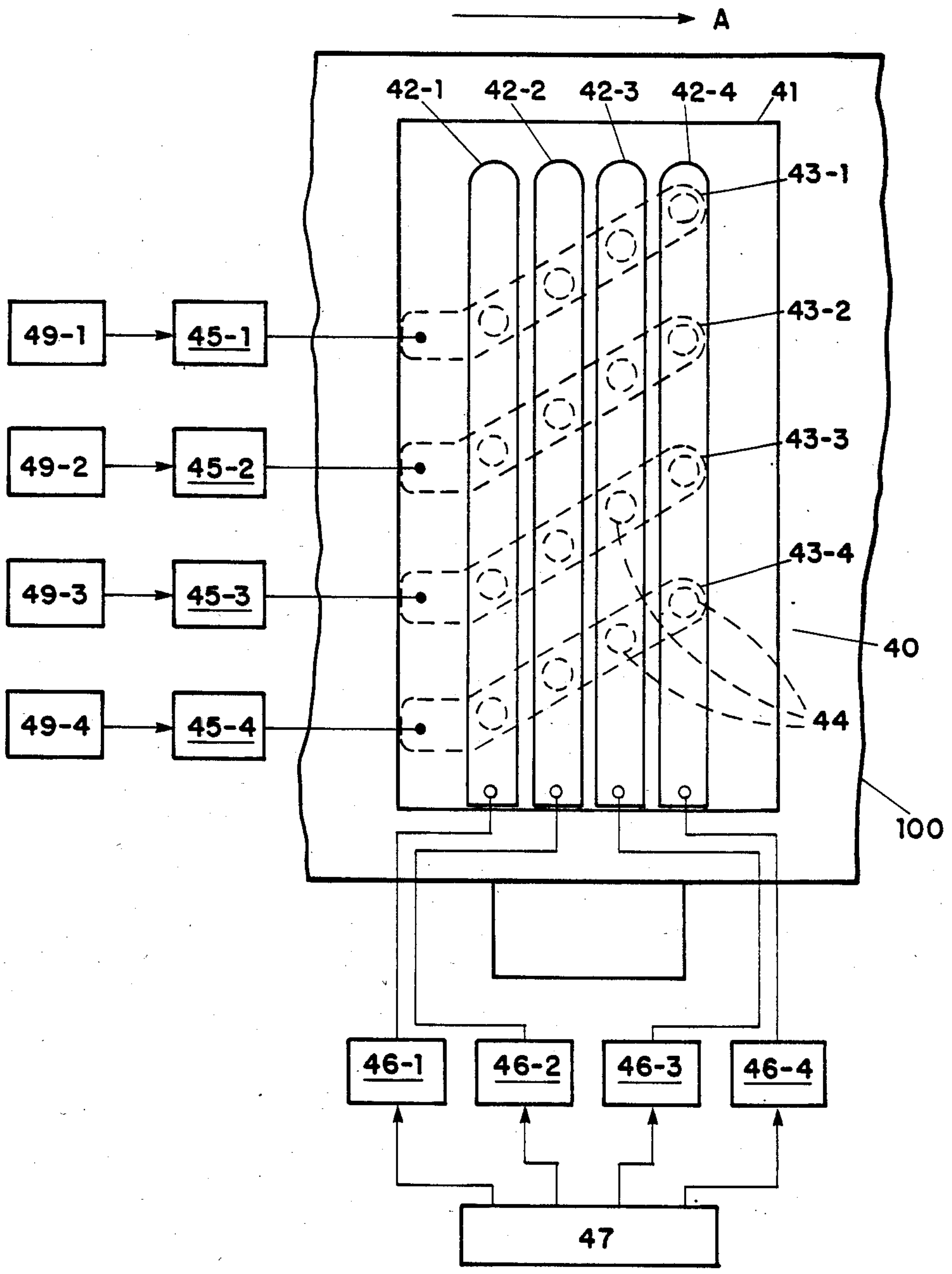
FIG. 6 is a schematic view of a further design for an electrostatic imaging device, with multiplexed drive circuitry.

FIG. 6 shows in a schematic view a further embodiment of a dot matrix imaging device 40 in accordance with the invention. The device 40 includes a plurality of selector bars 42-1, 42-2, etc. (shown in phantom) bonded to one face of dielectric sheet 41, and apertured finger electrodes 43-1, 43-2, etc. bonded to the opposite face. The device forms electrostatic images 45 on dielectric surface 100 in response to the drive signals 46-1, 46-2, etc. to drive electrodes 42, and signals 45-1, 45-2 etc. to control electrodes 43. A counter 47 may be employed to provide time division multiplexing. A series of phase shifters 49-1, 49-2, etc. are used to selectively induce electrical discharges in apertures 44 by regulating the phase of control drive signals 45-1, 45-2, etc. The imaging device 40 may move in direction A relative to surface 100 for electrostatic printing.

Figure 7:
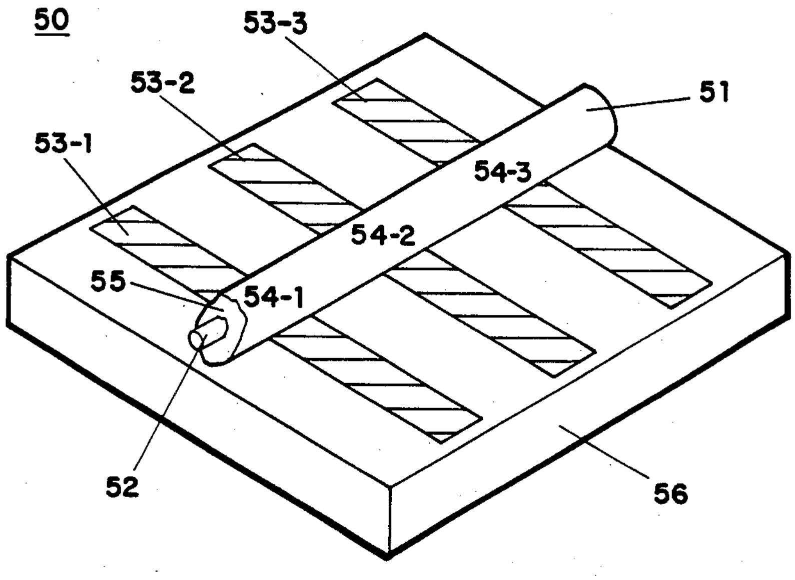
FIG. 7 is a partial perspective view of electrostatic imaging apparatus according to a further embodiment.

FIG. 7 gives a partial perspective view of a further structural type of imaging device 50. This device includes an elongate drive electrode 52 encased in a dielectric 51, mounted over a series of control bars 53-1, 53-2, 53-3. Additional geometries of this general type are disclosed in commonly assigned U.S. application Ser. No. 222,830 filed Jan. 5, 1981.

In multiplexed imaging apparatus such as that illustrated in FIG. 6 there is a substantial intercapacitance among adjacent driver and control electrodes. Capacitive "cross-talk" can interfere with the simultaneous imaging from a plurality of consecutive apertures 44. This can result in a degradation of the drive potential if an adjacent, idle driver provides a significant load; it is also aggravated by a higher source impedance in actuated drivers. It is therefore advantageous to utilize low source impedance drivers, or to clamp the electrodes 42, 46 to a low impedance condition in the absence of excitation.

Figure 10:
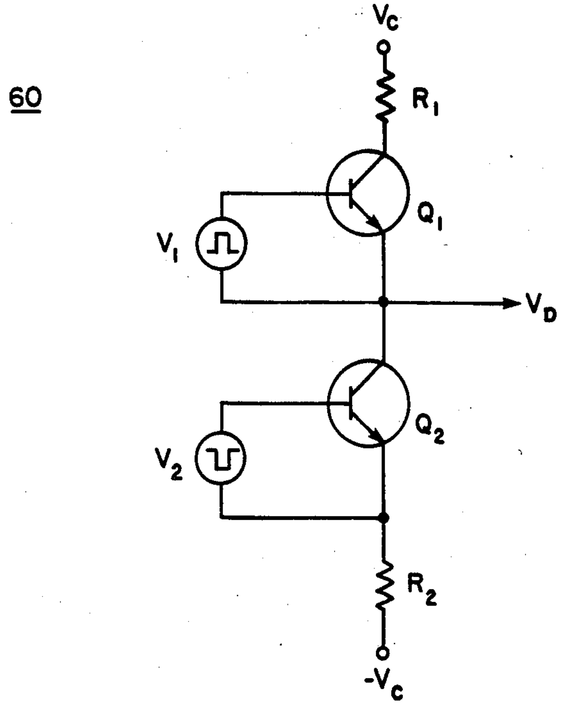
FIG. 10 is a schematic diagram of an illustrative drive circuit for an electrostatic imaging device according to the invention.

With reference to the circuit schematic diagram of FIG. 10, an illustrative drive circuit 60 consists of a transistor pulse generator including pulse sources $V_1$ and $V_2$, respectively gated by transistors $Q_1$ and $Q_2$. Pulse sources $V_1$ and $V_2$ alternatively assume "high" and "low" states. Transistor $Q_1$ has a collector bias of $V_C$, while transistor $Q_2$ has an emitter bias of $-V_C$. This arrangement provides a low source impedance in both the high and low state.

Figure 11:
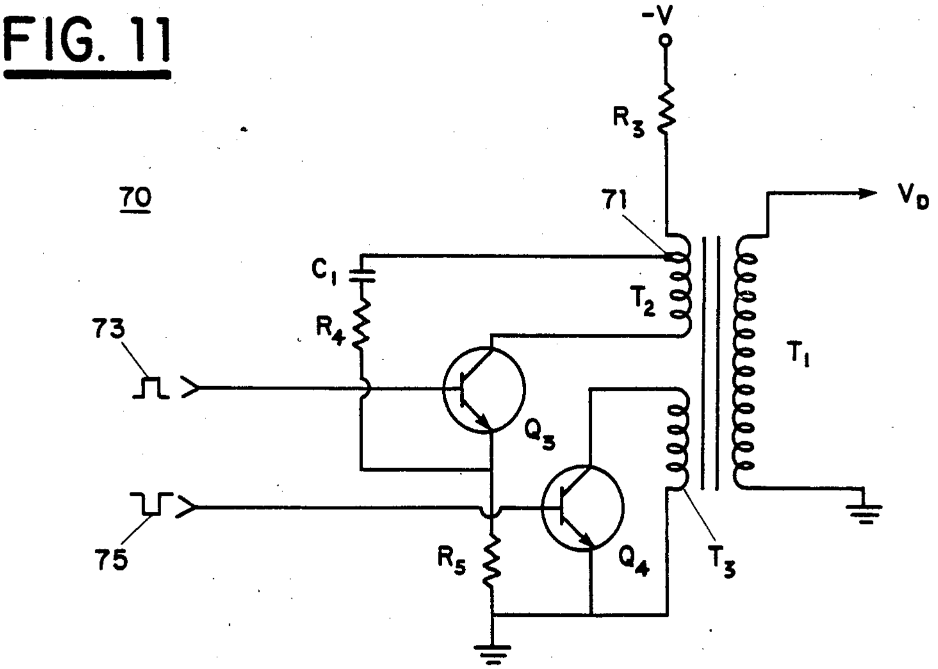
FIG. 11 is a schematic diagram of an alternative drive circuit.

A further drive circuit design is shown at 70 in FIG. 11. This gated oscillator circuit incorporates a three-winding transformer, in which the center tap of primary winding $T_2$ is RC-coupled to the emitter of transistor $Q_3$. Input signals 73 and 75 are alternatively "high" and "low" pulses. The third winding $T_3$ is shunted with transistor $Q_4$, to provide low source impedance in the absence of excitation.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

I claim:

1. Electrostatic imaging apparatus comprising:
a solid dielectric member;
a first electrode adjacent the solid dielectric member;
a second electrode adjacent an opposite portion of the solid dielectric member;
a further electrode member;
a first time-varying potential applied between said first electrode and the further electrode member; and
a second time-varying potential applied between said second electrode and said further electrode member, wherein the first and second time-varying potentials provide a potential difference between the first and second electrodes to selectively generate ions in a region adjacent the first electrode and the solid dielectric member, and wherein ions are extracted from said region in response to said first potential to form an electrostatic image.

2. Apparatus as defined in claim 1 wherein the first and second time-varying potentials comprise a direct current bias potential plus a time-varying component.

3. Apparatus as defined in claim 2 wherein the first and second potentials comprise periodically varying waveforms.

4. Electrostatic imaging apparatus comprising:
a solid dielectric member;
a first electrode adjacent the solid dielectric member;
a second electrode adjacent an opposite portion of the solid dielectric member;
a further electrode;
a first time-varying potential applied between said first electrode and the further electrode; and
a second time-varying potential applied to said further electrode;
the first and second time-varying potentials comprising a direct current bias and sinusoidally time-varying potentials of like amplitude which are 180° out of phase;
wherein the first and second time-varying potentials provide a potential difference between the first and second electrodes to selectively generate ions in a region adjacent the first electrode and the solid dielectric member, and wherein ions are extracted from said region in response to said first potential to form an electrostatic image.

5. Apparatus as defined in claim 2 wherein the time-varying components of the first and second potentials each comprise a series of pulses.

6. Electrostatic imaging apparatus comprising:
a solid dielectric member;
a first electrode adjacent the solid dielectric member;
a second electrode adjacent an opposite portion of the solid dielectric member;
a further electrode;
a first time-varying potential applied between said first electrode and the further electrode; and
a second time-varying potential applied to said further electrode; the first and second time-varying potentials each comprising a direct current bias and a time-varying component in the form of a series of pulses, which are of like amplitude and opposing polarities for the first and second potentials.

7. Apparatus as defined in claim 2 wherein the bias potential is of an amplitude which avoids arcing between either of the first and second electrodes, and the further electrode member.

8. Apparatus as defined in claim 1, comprising a plurality of first and second electrodes in a matrix array, with ion generation regions at matrix crossover points, and further comprising means for multiplexing said first and second potentials to generate ions at selected ion generation regions.

9. Electrostatic imaging apparatus comprising:
a solid dielectric member;
a first electrode adjacent the solid dielectric member;
a second electrode adjacent an opposite portion of the solid dielectric member;
a further electrode;
a first time-varying potential applied between said first electrode and the further electrode; and
a second time-varying potential applied to said further electrode;
wherein the first and second time-varying potentials provide a potential difference between the first and second electrodes to selectively generate ions in a region adjacent the first electrode and the solid dielectric member;
further comprising a plurality of first and second electrodes in a matrix array with ion generation regions at matrix crossover points, and including means for multiplexing said first and second potentials to generate ions at selected ion generation regions by selectively altering the phase relationship between predetermined first and second potentials.

10. Apparatus as defined in claim 1 wherein said first and second potentials are produced by low impedance sources.

11. Improved electrostatic imaging apparatus of the type including first and second electrodes at opposite sides of a solid dielectric member, with a time-varying potential between the electrodes to produce electrostatic discharges in an air region adjacent the first electrode and the solid dielectric member, and an extraction potential between the first electrode and a further electrode member to extract ions from said air region and form an electrostatic image, wherein the improvement comprises means for producing said time-varying potential and extraction potential, comprising:

a first time-varying potential applied between said first electrode and said further electrode member; and a second time-varying potential applied to said second electrode, wherein said first and second potentials provide a time-varying potential difference between said first and second electrodes to selectively generate ions in said air region, said first potential acting to extract these ions.

12. Apparatus as defined in claim 11 wherein the first and second time-varying potentials comprise a direct current bias potential plus a time-varying component.

13. Apparatus as defined in claim 11 wherein the first and second potentials comprise periodically varying waveforms.

14. Apparatus as defined in claim 11, of the type comprising a plurality of first and second electrodes in a matrix array, with ion generation regions at matrix crossover points, further comprising means for multiplexing said first and second potentials to generate ions at selected ion generation regions.

15. Apparatus as defined in claim 11 wherein said first and second potentials are produced by low impedance sources.

16. A method for the formation of electrostatic images comprising the steps of:

applying a first time-varying potential to a first electrode adjacent a solid dielectric member, applying a second time-varying potential to a second electrode adjacent an opposite portion of said solid dielectric member, and coordinating said first and second time-varying potentials to selectively generate ions in a region at a junction of one of the electrodes and the solid dielectric member.

17. A method as defined in claim 16, wherein said first and second time-varying potentials comprise direct current bias potentials plus a time-varying component.

18. A method as defined in claim 16, wherein said first and second time-varying potentials comprise periodically varying waveforms which intermittently generate ions.

19. A method as defined in claim 17 wherein the time-varying components of said first and second time-varying potentials comprise waveforms selected from the group: sinusoidally alternating potentials with an essentially 180° phase difference; periodic pulses; and periodic pulses of like amplitude and opposing polarities.

20. A method for the formation of electrostatic images comprising the steps of:

applying a first time-varying potential between a first electrode adjacent a solid dielectric member and a further electrode, applying a second time-varying potential to a second electrode adjacent an opposite portion of said solid dielectric member, and coordinating said first and second time-varying potentials by selectively varying their phase relationship to selectively generate ions in a region at a junction of the first electrode and the solid dielectric member, and extracting said ions under the influence of said first potential to form an electrostatic image.

21. The method of generating ions which comprises applying separate oppositely varying signals to opposite electrodes which are separated by a solid dielectric.

* * * * *